United States Patent [19]

Price

[11] Patent Number: 4,586,107
[45] Date of Patent: Apr. 29, 1986

[54] DRY CAPACITOR CIRCUIT INTERRUPTER

[76] Inventor: Frank D. Price, Nolan Rd., South Glens Falls, N.Y. 12801

[21] Appl. No.: 617,662

[22] Filed: Jun. 5, 1984

[51] Int. Cl.⁴ .............................................. H01G 1/06
[52] U.S. Cl. .................................................. 361/272
[58] Field of Search ........................ 361/272, 275, 331

[56] References Cited

U.S. PATENT DOCUMENTS

| | | | |
|---|---|---|---|
| 3,377,510 | 4/1968 | Rayno | 317/12 |
| 4,106,068 | 8/1978 | Flanagan | 361/15 |
| 4,109,291 | 8/1978 | Bozzini | 361/272 |
| 4,283,750 | 8/1981 | Deschnels et al. | 361/274 |
| 4,454,561 | 6/1984 | Pearce et al. | 361/275 |
| 4,486,809 | 12/1984 | Deak et al. | 361/272 |

OTHER PUBLICATIONS

Paper by Curtis, Edwards and Constandineau, "Some Recent Developments in Low and High Voltage Power Capacitors", presented at the *Fourth Beama International Insulation Conference*, Brighton, England, May 10-13, 1982, pp. 91-99.

*Primary Examiner*—Donald A. Griffin

[57] ABSTRACT

A dry capacitor interrupter employs a sealed container spaced about a dry capacitor to contain gas emitted upon failure of the dry capacitor and to thereby permit gas pressure to develop within the container regardless of the location on the dry capacitor from which the gas is emitted. A deformable cover on the container is deformed outward by the gas pressure to thereby break a connection between a terminal stud and a tab within the container. The breakage of the connection effectively removes the dry capacitor from electrical connection to external circuits.

10 Claims, 4 Drawing Figures

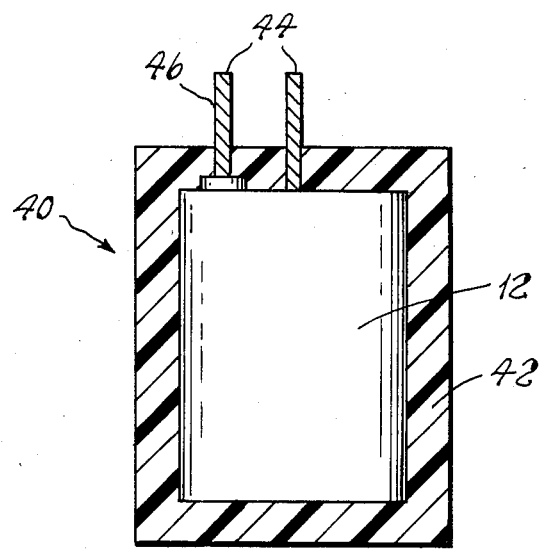
Fig. 3 — PRIOR ART
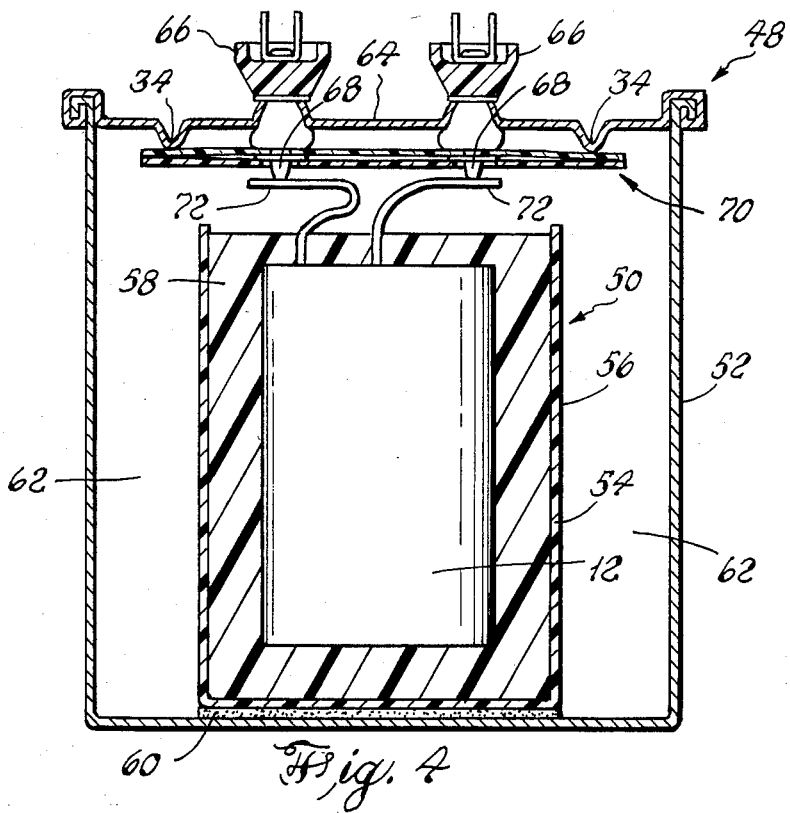
Fig. 4

DRY CAPACITOR CIRCUIT INTERRUPTER

BACKGROUND OF THE INVENTION

The present invention relates to electrical apparatus and, more particularly, to electrical capacitors having protective means for removing electrical capacitors from their electrical circuits in the event of a failure thereof.

The present invention is particularly, but not exclusively, applicable to capacitors employed for power factor correction in such apparatus as appliance motors and lighting systems. In the past, such capacitors have been enclosed in liquid-filled sealed cans which are conventionally enclosed within housings of, for example, ballasts for high-intensity discharge lighting systems. The capacitors are frequently included within the asphalt, or other potting compounds, within the ballast housings.

The active portion of such a capacitor typically consists of a roll of a metallized dielectric material such as, for example, a metallized polypropylene or polyester film sealed within the can. A liquid dielectric fills a substantial portion of the space between the capacitor roll and the can. External terminals pass sealingly through the can to make electrical contact with the metallized surface.

When such a capacitor near the end of its life, its failure modes tend to generate heat. The generated heat, in turn, tends to accelerate the failure until a thermal runaway condition produces an extremely rapid temperature rise accompanied by the generation of a quantity of gas which is capable of exerting a substantial pressure on the interior of the can. The gas pressure is frequently sufficient to rupture the can and to thereby release the liquid dielectric. When the capacitor is included within the asphalt potting compound the released liquid may mix with the potting compound and the liquid mixture of dielectric and potting compound may escape from the ballast housing and stain or damage external portions of the fixture containing the capacitor as well as nearby furniture and other objects. In addition to the above staining problem, the rupture may occur explosively with the accompanying production of an explosive bang and the emission of substantial quantities of smoke. Such occurrences have been known to alarm the uniformed observer.

One prior solution for preventing the degradation of a sealed capacitor to a danger point is disclosed in the Rayno U.S. Pat. No. 3,377,510, of common assignee with the present invention, the disclosure of which is herein incorporated by reference. The Rayno invention employs the bulging of the cover of the capacitor can in response to internal pressure to break an electrical connection with the capacitor roll within the can. Breaking the electrical connection effectively removes the capacitor from the electrical source and halts the further generation of failure-derived heat.

A further prior solution is disclosed in the Flanagan U.S. Pat. No. 4,106,068, of common assignee with the present invention, the disclosure of which is also herein incorporated by reference. The Flanagan invention adds a plurality of fulcrum members operating on a bridge member within the liquid filled can to improve the leverage applied to the internal connections in order to break more than one of the internal connections, and thereby more positively to remove the capacitor roll from the source of electrical power.

Suitable capacitors for the above-recited and other applications may now be fabricated in a manner which eliminates the need for the internal liquid dielectric. Such capacitors, hereinafter referred to as dry capacitors, no longer require the sealed can to prevent leakage of a liquid dielectric. Dry capacitors typically consist of a roll of one or more metallized dielectric sheets enclosed within a housing of a plastic resin.

When a dry capacitor fails, it generates a substantial quantity of gas which may rupture the resin housing. The rupture may occur slowly or explosively and is typically accompanied by an emission of smoke. In addition, the temperatures generated in a failure may be sufficient to exceed the flash point of the capacitor or its environment. The place on the housing where the rupture may occur is not readily predictable. Since the need for a sealed can has been eliminated by the omission of a liquid dielectric, the bulging of the sealed can, which the Rayno and Flanagan inventions relied on for circuit interruption, cannot be relied on for early detection of the failure condition and interruption of the electrical circuit.

One attempt to provide an interruptor for such a dry capacitor is disclosed in U.S. Pat. No. 4,283,750 in which a crease is provided in a metallic case within which the plastic resin is cast. The crease is intended to function as a type of bellows which expands under gas pressure to sever an internal connection. The unpredictability of the location at which the gas pressure may develop limits the applicability of the disclosed device. In tests of capacitors having resin casings cast within metal cans it was discovered that the internal gas pressure has no difficulty rupturing both the resin casings and the metal cans in the immediate vicinity of the failure without migrating substantially within the can in any predictable direction. This would seem to indicate that operation of the disclosed device may depend on fortuitous location of the failure site in the vicinity of the crease.

A further possibility is disclosed in a paper entitled "Some Recent Developments in Low and High Voltage Power Capacitors" which was presented at the *FOURTH BEAMA INTERNATIONAL ELECTRICAL INSULATION CONFERENCE* held in Brighton, England in 1982 by Curtis, Edwards and Constandinou. Using a common European technique normally applied to liquid-filled capacitors in sealed cans, the paper discloses a corrugated bellows portion of a metallic can within which a cured thermosetting resin casing is cast about a capacitor roll. The bellows portion provides a region on the can which is longitudinally expandable under the influence of internal gas pressure. The longitudinal expansion of the bellows portion is employed to sever one or more notched wires therein and to thereby interrupt electrical connection to the capacitor roll. In one illustration, the paper discloses a metallized film capacitor having a cured thermoset resin inside the can. In order to permit the gas to reach the bellows portion of the can, the paper mentions, without specifications thereon, the use of an outer wrap on the capacitor roll which includes a gas conducting liner.

OBJECTS AND SUMMARY OF THE INVENTION

Accordingly, it is an object of the invention to provide a circuit interruptor for a dry capacitor.

It is a further object of the invention to provide a circuit interruptor for a dry capacitor which employs an auxiliary sealed can external to the dry capacitor and apparatus for sensing distortion of the sealed can resulting from failure-generated gas pressure for interrupting electrical connection to the dry capacitor.

Briefly stated, the present invention provides a dry capacitor interrupter which employs a sealed gas-filled container spaced about a dry capacitor to contain gas emitted upon failure of the dry capacitor. The presence of the sealed container permits gas pressure to develop within the container regardless of the location on the dry capacitor from which the gas is emitted. A deformable cover on the container is deformed outward by the gas pressure to thereby break a connection between a terminal stud and a tab within the container. The breakage of the connection effectively removes the dry capacitor from electrical connection to external circuits.

According to an embodiment of the invention, there is provided a dry capacitor system comprising a dry capacitor, the dry capacitor including at least a capacitor roll, a can surrounding the capacitor roll, means for securing the capacitor roll within the can, the can having a dimension sufficient to provide a gas-filled space between it and the capacitor roll, a sealing cover sealingly closing the can, the sealing cover being of a type which is deformable under a gas pressure within the can, at least one terminal passing sealably through the cover, a terminal stud extending through the terminal and having an inner end terminating within the can, at least one tab connected to the capacitor roll, the tab extending from the capacitor roll into contact with the inner end, means for affixing the tab to the inner end, a circuit interrupter at an interface of the tab and the inner end and the circuit interrupter including means responsive to a deformation of the cover for breaking the means for affixing whereby the dry capacitor is removed from an electrical circuit.

According to a feature of the invention, there is provided a dry capacitor system comprising a dry capacitor, the dry capacitor including at least a capacitor roll, a cup-like container surrounding the capacitor roll, a thermosetting resin substantially filling the cup-like container and encapsulating the capacitor roll, a can surrounding the cup-like container, a layer of adhesive between an outside bottom of the cup-like container and an inside bottom of the can, the layer of adhesive being effective for securing the dry capacitor within the can, the can having a dimension sufficient to provide a gas-filled space between it and the cup-like container, a sealing cover sealingly closing the can, the sealing cover being of a type which is deformable under a gas pressure within the can, at least one terminal passing sealably through the cover, a terminal stud extending through the terminal and having an inner end terminating within the can, at least one tab connected to the capacitor roll, the tab extending from the capacitor roll into contact with the inner end, means for affixing the tab to the inner end, a circuit interrupter at an interface of the tab and the inner end and the circuit interrupter including a bridge member, the bridge member including at least one hole therein, the inner end passing through the hole, the hole being sized to prevent passage of the tab therethrough, the bridge member including means effective for applying a separating force to the means for affixing in response to the deformation of the cover the separating force being effective for breaking the means for affixing whereby the dry capacitor is removed from an electrical circuit.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a cross section of a dry capacitor according to the prior art.

FIG. 4 is a cross section of a dry capacitor system including a circuit interrupter according to an embodiment of the invention.

DETAILED DESCRIPTION OF THE PREFERRED EMBODIMENT

Figure 1:
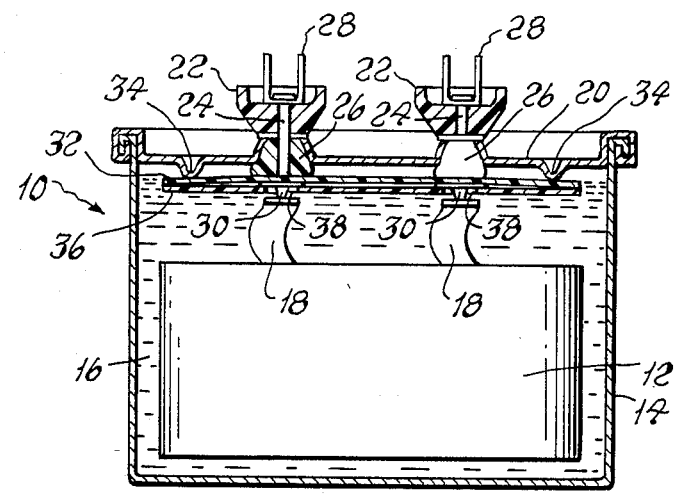
FIG. 1 is a cross section of a sealed, liquid-containing capacitor having a circuit interruptor according to the prior art.

Referring first to FIG. 1, there is shown, generally at 10, a liquid-containing sealed capacitor according to the prior art. The illustrated embodiment of sealed capacitor 10 is, in fact, of the type disclosed in the referenced Flanagan patent and is described hereinbelow in order to provide a background for an understanding of the present invention. The corresponding apparatus disclosed in the referenced Rayno patent, which is described both in its own disclosure and is summarized in the Flanagan patent, could equally serve as an example of the prior art.

A capacitor roll 12, which may consist of one or more layers of a metallized dielectric film rolled into a cylindrical shape and optionally compressed into a flattened cylindrical shape, is disposed within a can 14. Can 14 is suitably larger in size than capacitor roll 12 thereby leaving a space 16 between capacitor roll 12 and can 14 which is conventionally filled with a dielectric liquid.

A pair of tabs 18, electrically attached to the metallized portions of capacitor roll 12, extend curvingly upwardly from capacitor roll 12. A cover 20 sealingly closes the opening of can 14. A pair of terminals 22 are sealingly disposed in cover 20. A terminal stud 24 passes centrally through a bushing 26 of terminal 22. Terminal 22 includes a prong connector 28 at its outer end and a hemispheric shape at its inner end 30. The hemispheric shape of inner end 30 is welded to its respective tab 18. An insulating sheet 32 is attached between inner ends of terminals 22 and extends laterally at least beyond a pair of inwardly directed fulcrum indentations 34 in cover 20 spaced inwardly from the sidewalls of can 14. A bridge member 36 is disposed within can 14 between insulating sheet 32 and capacitor roll 12. Bridge member 36 includes holes 38 aligned with and loosely fitting each inner end 30.

Figure 2:
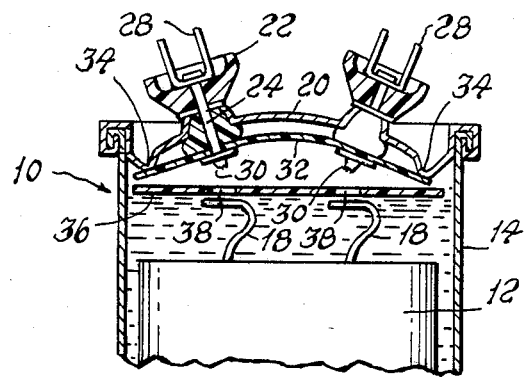
FIG. 2 is a cross section of the liquid-containing capacitor of FIG. 1 wherein circuit connection has been interrupted by internal gas pressure.

Referring now to FIG. 2, as fully detailed in the referenced patent, when failure of sealed capacitor 10 produces a sufficient internal gas pressure, cover 20 is bulged outward thereby. The action of fulcrum indentations 34 in contact with bridge member 36 applies sufficient tensile, twisting and transverse forces to the welded bonds between inner ends 30 and tab 18 to thereby break the welded bonds as shown and thus remove sealed capacitor 10 from further interaction with an electrical circuit connected to its prong connectors 28.

Referring now to FIG. 3, there is shown, generally at 40, a dry capacitor according to the prior art. Dry capacitor 40 includes a capacitor roll 12 of a form similar to the above-described prior art embodiments. Instead of being contained in a liquid-filled can, however, capacitor roll 12 is encapsulated in a resin molded casing 42 covering the sides, bottom and top of capacitor roll 12. The resin used for molded casing 42 may include, for example, a suitable epoxy or urethane resin among others. A plurality of terminals 44 are electrically connected at their inner ends to capacitor roll 12 by conventional means and provide external connection portions 46 for connection to the electrical circuit with which it is to be used.

In the event of the failure of dry capacitor 40, molded casing 42 may permit internal gas pressure to develop. The development of internal gas pressure may be followed by explosive, or non-explosive, rupture of molded casing 42 and the emission of smoke. The point of rupture is not readily predictable depending, as it does, on the location within capacitor roll 12 at which the failure occurs. Since a pressure-deformable flexible cover on a sealing can which may be reached and deformed by the exiting gas is not included in the dry capacitor of FIG. 3, the techniques for interrupting power connection to dry capacitor 40 in the manner disclosed in the Rayno and Flanagan patents is not available.

Referring now to FIG. 4, a dry capacitor assembly 48 is shown according to an embodiment of the invention. Dry capacitor assembly 48 includes a dry capacitor 50 within a metallic can 52. Dry capacitor 50 includes a capacitor roll 12 within a casing 54. Casing 54 may be of any convenient type including, for example, a plastic cup-like container 56 which provides a castable shape into which a thermosetting resin 58 may be poured about capacitor roll 12 and thereafter may be cured. Alternatively, plastic cup-like container 56 may be eliminated and capacitor roll 12 may be directly molded within thermosetting resin 58. As a further alternative, plastic cup-like container 56 may be replaced by a corresponding metallic cup (not shown) into which thermosetting resin 58 may be cast and cured. As a still further alternative, casing 54 may be replaced with a metallic case, either closed or open, without a layer of thermosetting resin 58 between it and capacitor roll 12. In this latter example, a conventional insulating material may be employed to prevent electrical contact between the metal and the metallized layers (not shown) on capacitor roll 12. A layer of adhesive 60 of a conventional type is disposed between an outside bottom of casing 54 and an inside bottom of metallic can 52 in order to secure casing 54 in location within metallic can 52. It will be noted that metallic can 52 is oversized for casing 54 to thereby leave a space 62 around and above dry capacitor 50 for reasons which are detailed hereinafter.

A metallic cover 64 closes and seals metallic can 52 to provide a gas-tight enclosure surrounding dry capacitor 50. One or more terminals 66 pass sealingly through metallic cover 64. A terminal stud 68 passes through each terminal 66.

The structure of FIG. 4, since it now provides a gas-tight container with a deformable metallic cover 64 which can be reached and deformed by the escape of gas from casing 54 regardless of the location on casing 54 where the rupture occurs, permits the use of a circuit interrupter 70 of a type disclosed in the Rayno or Flanagan patents (the type disclosed in the Flanagan patent is illustrated in FIG. 4). In order to adapt casing 54 for use with circuit interrupter 70, the terminals 44 (see FIG. 3) of the prior art dry capacitor 40 are replaced with tabs 72 electrically attached to capacitor roll 12 by conventional means and extending outward through thermosetting resin 58 (if used) for welded connection to inner ends of terminal studs 68.

In operation, when a failure in dry capacitor 50 causes the explosive, or non-explosive, release of gas from dry capacitor 50, the gas remains contained within metallic can 52 to thereby permit the buildup of gas pressure therein. The gas pressure deforms metallic cover 64 outward as detailed in the description of the prior art and causes the welded connection between terminal studs 68 and tabs 72 to become broken. Since the structure and function of circuit interrupter 70 is fully detailed in the preceding description augmented by the disclosures of the referenced patents which are herein incorporated by reference, a fuller description here is considered redundant and is therefore omitted.

In addition to the exemplary embodiment shown and described in the preceding, variations in the apparatus may be employed without departing from the spirit and scope of the invention. For example, capacitor roll 12 may be a single sheet rolled to form capacitor roll 12 or it may be a plurality of sheets rolled to form either related or independent capacitive elements. Such plurality of sheets may be concentrically rolled to form capacitor roll 12 or they may be individually rolled and included within capacitor roll 12. When additional sheets are employed to form capacitor roll 12, the use of additional terminals (not shown) may be required and such additional terminals should be considered to be encompassed within the scope of the invention. Other convenient means may be employed to retain capacitor roll 12 in place within can 14. Conventional mechanical means such as, for example, clamps or springs (not shown) may be employed. In addition, conventional mechanical fasteners such as, for example, screws, rivets or weld spots (not shown) may be substituted for layer of adhesive 60 without departing from the spirit and scope of the invention. A thermoplastic resin may be substituted for thermosetting resin 58 without departing from the scope of the invention.

A layer of a gas-permeable material (not shown) may be included on the outside of capacitor roll 12 to permit axial and/or circumferential migration of gas within casing 54. One or more openings (not shown) may be provided in casing 54 communicating with such layer for permitting the exit of gas into space 62. This may avoid or reduce the explosiveness of the rupture of casing 54 by easing the exit of gas from casing 54. Although it may mediate the violence of the rupture of casing 54, the presence or absence of a gas-permeable material on capacitor roll 12 does not affect the utility of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A dry capacitor system comprising:

a dry capacitor;
said dry capacitor including at least a capacitor roll;
a can surrounding said capacitor roll;
means for securing said capacitor roll within said can;
said can having a dimension sufficient to provide a space between it and said capacitor roll;
a sealing cover sealingly closing said can;
said sealing cover being of a type which is deformable under a gas pressure within said can;
at least one terminal passing sealably through said cover;
a terminal stud extending through said terminal and having an inner end terminating within said can;
at least one tab connected to said capacitor roll;
said tab extending from said capacitor roll into contact with said inner end;
means for affixing said tab to said inner end;
a circuit interrupter at an interface of said tab and said inner end; and
said circuit interrupter including means responsive to a deformation of said cover for breaking said means for affixing whereby said dry capacitor is removed from an electrical circuit.

2. A dry capacitor according to claim 1 wherein said means responsive to a deformation includes a bridge member, said bridge member including at least one hole therein, said inner end passing through said hole, said hole being sized to prevent passage of said tab therethrough, said bridge member including means effective for applying a separating force to said means for affixing in response to said deformation of said cover.

3. A dry capacitor according to claim 1 wherein said dry capacitor includes a casing, said casing including at least a thermosetting resin surrounding said capacitor roll.

4. A dry capacitor according to claim 3 wherein said means for securing said capacitor roll includes a layer of adhesive between an outside bottom of said casing and an inside bottom of said can.

5. A dry capacitor according to claim 3 wherein said casing incudes a cup-like container and said thermosetting resin is cast in said cup-like container.

6. A dry capacitor according to claim 5 wherein said cup-like container is a plastic container.

7. A dry capacitor according to claim 5 wherein said cup-like container is a metal container.

8. A dry capacitor according to claim 5 wherein said means for securing said capacitor roll includes a layer of adhesive between an outside bottom of said cup-like container and an inside bottom of said can.

9. A dry capacitor according to claim 5 wherein said cup-like container incudes an open top and said at least one tab extends through said open top.

10. A dry capacitor system comprising:
a dry capacitor;
said dry capacitor including at least a capacitor roll;
a cup-like container surrounding said capacitor roll;
a thermosetting resin substantially filling said cup-like container and encapsulating said capacitor roll;
a can surrounding said cup-like container;
a layer of adhesive between an outside bottom of said cup-like container and an inside bottom of said can, said layer of adhesive being effective for securing said dry capacitor within said can;
said can having a dimension sufficient to provide a space between it and said cup-like container;
a sealing cover sealingly closing said can;
said sealing cover being of a type which is deformable under a gas pressure within said can;
at least one terminal passing sealably through said cover;
a terminal stud extending through said terminal and having an inner end terminating within said can;
at least one tab connected to said capacitor roll;
said tab extending from said capacitor roll into contact with said inner end;
means for affixing said tab to said inner end;
a circuit interrupter at an interface of said tab and said inner end; and
said circuit interrupter including a bridge member, said bridge member including at least one hole therein, said inner end passing through said hole, said hole being sized to prevent passage of said tab therethrough, said bridge member including means effective for applying a separating force to said means for affixing in response to said deformation of said cover said separating force being effective for breaking said means for affixing whereby said dry capacitor is removed from an electrical circuit.

* * * * *

UNITED STATES PATENT AND TRADEMARK OFFICE
CERTIFICATE OF CORRECTION

PATENT NO. : 4,586,107
DATED : April 29, 1986
INVENTOR(S) : Frank D. Price

It is certified that error appears in the above-identified patent and that said Letters Patent is hereby corrected as shown below:

Page 1, after " [76] Inventor: Frank D. Price, Nolan Road, South Glens Falls, N.Y. 12801", insert:

-- [73] Assignee: General Electric Company, Hudson Falls, N.Y.--

Signed and Sealed this

Twelfth Day of August 1986

[SEAL]

Attest:

Attesting Officer

DONALD J. QUIGG

Commissioner of Patents and Trademarks